(12) United States Patent
Machalica

(10) Patent No.: US 11,475,179 B2
(45) Date of Patent: Oct. 18, 2022

(54) SYSTEMS AND METHODS FOR ASSIGNING PRODUCT AND MANUFACTURING INFORMATION TO COMPUTER-AIDED DESIGN MODELS

(71) Applicant: General Electric Company, Schenectady, NY (US)

(72) Inventor: Dawid Tadeusz Machalica, Warsaw (PL)

(73) Assignee: General Electric Company, Schenectady, NY (US)

( * ) Notice: Subject to any disclaimer, the term of this patent is extended or adjusted under 35 U.S.C. 154(b) by 209 days.

(21) Appl. No.: 16/703,933

(22) Filed: Dec. 5, 2019

(65) Prior Publication Data

US 2020/0184125 A1 Jun. 11, 2020

(30) Foreign Application Priority Data

Dec. 7, 2018 (PL) .......................................... 428073

(51) Int. Cl.
*G06F 30/17* (2020.01)
*G06F 30/20* (2020.01)
*G06F 30/12* (2020.01)

(52) U.S. Cl.
CPC .............. *G06F 30/17* (2020.01); *G06F 30/12* (2020.01); *G06F 30/20* (2020.01)

(58) Field of Classification Search
CPC .......... G06F 30/17; G06F 30/00; G06F 30/20; G06F 30/12; G06F 2111/16; G06F 2119/18; G06F 30/10; Y02P 90/02
USPC ........................................................ 703/7, 6
See application file for complete search history.

(56) References Cited

U.S. PATENT DOCUMENTS

2008/0269942 A1* 10/2008 Free ........................ G06F 30/00
700/182
2013/0097489 A1 4/2013 Linder et al.

FOREIGN PATENT DOCUMENTS

WO 2014193736 A1 12/2014

OTHER PUBLICATIONS

Lipman, Robert et al., "Conformance Checking of PMI Representation in CAD Model STEP Data Exchange Files", Apr. 20, 2015, Computer Aided Design 66, Elsevier Ltd. (Year: 2015).*

* cited by examiner

*Primary Examiner* — Cedric Johnson
(74) *Attorney, Agent, or Firm* — Fletcher Yoder, P.C.

(57) ABSTRACT

A system that renders computer-aided design (CAD) models of a part, an assembly, or both includes identifying a deficient CAD model missing expected Product and Manufacturing Information (PMI) objects, based upon features not being associated with the missing expected PMI objects. The system also includes querying a database of existing CAD models to identify existing PMI objects, including a PMI reference indicating a particular type of PMI data and PMI annotation to use for the missing expected PMI objects, of a reference CAD model. The system also includes attributing a subset of the existing PMI objects to features of the deficient CAD model, by identifying features that the subset of the existing PMI objects are associated to and identifying corresponding features in features of the deficient CAD model, and assigning the subset of the existing PMI objects to the corresponding features in the of the deficient CAD model.

20 Claims, 10 Drawing Sheets

SYSTEMS AND METHODS FOR ASSIGNING PRODUCT AND MANUFACTURING INFORMATION TO COMPUTER-AIDED DESIGN MODELS

CROSS-REFERENCE TO RELATED APPLICATIONS

This application claims the benefit of Polish Patent Application No. P.428073 filed on Dec. 7, 2018, the disclosure of which is herein incorporated by reference in its entirety.

BACKGROUND OF THE INVENTION

The subject matter disclosed herein relates to systems and methods for assigning product and manufacture information (PMI) to computer-aided design (CAD) models, such as CAD models for industrial machine parts and assemblies.

Industrial machines, machine parts, and/or machine assemblies, may be developed for a particular purpose, such as a compressor blade developed to compress air. Furthermore, these machine components may include complex systems with many complex features. These features are typically individually managed in a computer aided design (CAD) system. As such, 3-dimensional (3D) models and/or 2-dimensional (2D) models (hereinafter referred to as "CAD models") may be generated to facilitate the manufacturing of the industrial machines, the machine parts, and/or machine assemblies.

Certain enterprises may be responsible for engineering and managing a wide variety of industrial machines, machine parts, and machine assemblies. For enterprises engineering and managing these components, it may be necessary that the CAD models include appropriate product and manufacturing information (PMI). Generally, PMI may be displayed on a CAD model as PMI objects and may include information helpful in manufacturing the part or assembly in accordance with desired measurements, tolerances, etc. Typically, assigning a part PMI may require personnel to manually label features of the CAD model corresponding to the industrial machines, machine part, or machine assembly. While manually labeling the CAD model with PMI may facilitate the manufacture of the part or assembly, the tedious task of manually assigning PMI may require a large amount of time and resource expenditures. In addition, such method of assigning PMI to the CAD model may redundant, leading to human error and an inefficient use of time. In view of the complexity associated with the CAD models, automating the process of assigning PMI to the CAD models may be difficult to implement in practice.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system that renders computer-aided design (CAD) models of a part, an assembly, or both includes identifying a deficient CAD model missing expected Product and Manufacturing Information (PMI) objects, based upon features not being associated with the missing expected PMI objects. The system also includes querying a database of existing CAD models to identify existing PMI objects, including a PMI reference indicating a particular type of PMI data and PMI annotation to use for the missing expected PMI objects, of a reference CAD model. The system also includes attributing a subset of the existing PMI objects to features of the deficient CAD model, by identifying features that the subset of the existing PMI objects are associated to and identifying corresponding features in features of the deficient CAD model, and assigning the subset of the existing PMI objects to the corresponding features in the of the deficient CAD model.

In a second embodiment, a computer-implemented method for a computer-aided technology (CAx) system includes identifying, via a processor-based device of a CAD system, a deficient CAD model missing one or more expected Product and Manufacturing Information (PMI) objects based upon one or more features not being associated with the missing one or more expected PMI objects. The computer-implemented method further includes querying, via the processor-based device, a database of one or more existing CAD models to identify one or more existing PMI objects of a reference CAD model of the one or more existing CAD models. The existing one or more PMI objects include a PMI reference indicating a particular type of PMI data to use for the missing one or more expected PMI objects. The computer-implemented method also includes attributing, via the processor-based device, a subset of the one or more existing PMI objects to one or more features of the deficient CAD model by identifying features that the subset of the one or more existing PMI objects are associated to and identifying corresponding features in the one or more features of the deficient CAD model. The computer-implemented method also includes assigning, via the processor-based device, the subset of the one or more existing PMI objects to the corresponding features in the one or more features of the deficient CAD model.

In a third embodiment, a tangible, non-transitory, computer-readable medium includes computer-readable instructions that, when executed by one or more processors of a computer of a CAx system, cause the one or more processors to identify a deficient CAD model missing one or more expected Product and Manufacturing Information (PMI) objects, based upon one or more features not being associated with the missing one or more expected PMI objects; query a database of one or more existing CAD models to identify one or more existing PMI objects of a reference CAD model of the one or more existing CAD models, the one or more existing PMI objects including a PMI reference indicating a particular type of PMI data to use for the missing one or more expected PMI objects; attribute a subset of the one or more existing PMI objects to one or more features of the deficient CAD model, by identifying features that the subset of the one or more existing PMI objects are associated to and identifying corresponding features in the one or more features of the deficient CAD model; and assign the subset of the one or more existing PMI objects to the corresponding features in the one or more features of the deficient CAD model.

BRIEF DESCRIPTION OF THE DRAWINGS

These and other features, aspects, and advantages of the present claimed subject matter will become better understood when the following detailed description is read with reference to the accompanying drawings in which like characters represent like parts throughout the drawings, wherein:

DETAILED DESCRIPTION OF THE INVENTION

Figure 1:
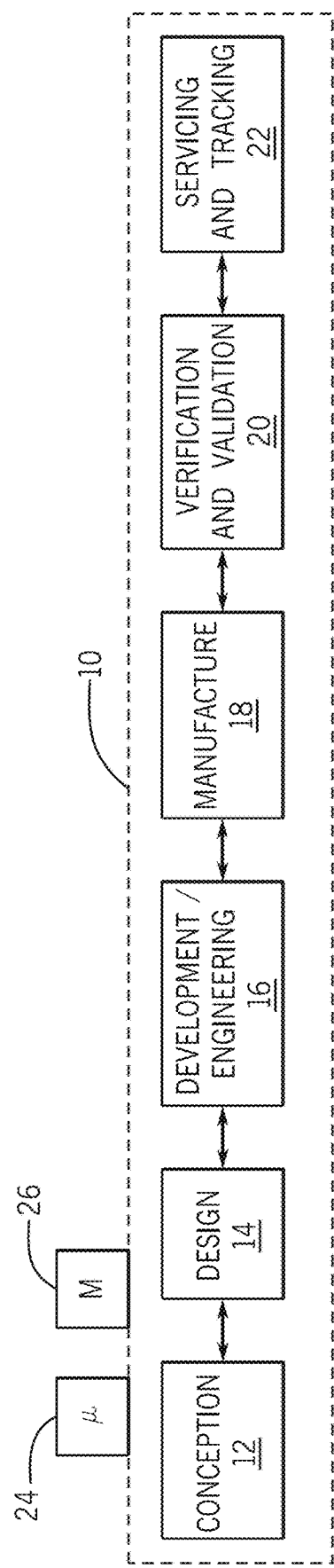
FIG. 1 is a block diagram of an embodiment of stages of use associated with a computer-aided technology (CAx) system, in accordance with an aspect of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of development, fabrication, and manufacture for those of ordinary skill having the benefit of this disclosure.

When introducing elements of various embodiments of the present claimed subject matter, the articles "a," "an," "the," and "said" are intended to mean that there are one or more of the elements. The terms "comprising," "including," and "having" are intended to be inclusive and mean that there may be additional elements other than the listed elements.

Developing a machine or part may include certain systems and methods described in more detail below that produce a model of a part or assembly (e.g., an industrial machine or machine part). For example, the model of the part or assembly may be created as a model-based definition included in a 2-dimensional (2D) or a 3-dimensional (3D) computer aided design (CAD) model. "Model," as used herein, may refer to a 2D model, a 3D model, or any other view of a part generated within a computer-aided technology (CAx) system that may be displayed on a screen, the window of a computer-aided design (CAD) system, and so forth.

With this in mind, after creating the 3D CAD part, hereinafter referred to as the "part," a drawing of the part may be generated by a computer-aided technologies (e.g., CAx) system. The drawing may be used to manufacture the part according to the Product and Manufacturing Information (PMI). In some instances, PMI may be an alternative to typical 2D drawings, in that Model Based Definition that includes PMI is prepared in a 3D space as opposed to a 2D space. As such, PMI may transfer more information about a part or assembly because the part may be manipulated in 3D space and regions of the part that would otherwise be hidden in 2D space are available (e.g., to be labeled with suitable PMI). For example, a surface of a part that must be machined in a certain manner may include PMI linked to that surface, such that the PMI provides information indicative of the machining operation to be performed on that surface. Because of PMI may be read directly by a machine executing machining operation or the inspection of the part or assembly, a drawing is often not necessary. However, in some instances, drawings may be preferred. In some embodiments, the PMI may adhere to standards such as ASME Y14.41-2003 Digital Product Data Definition Practices and ISO 1101:2004 Geometrical Product Specifications (GPS)—Geometrical tolerancing.

As used herein, "Product and Manufacturing Information (PMI) objects" refers to indications, such as annotations, callouts, notes, text, and so forth displayed on the drawing and/or model to provide PMI data. In some embodiments, the PMI objects may include a visual indication providing PMI data associated with a specific feature assigned the PMI object. Drawings and/or the models of the parts or assemblies (i.e., a plurality of assembled parts) may contain PMI objects used to describe a feature of the part. For example, a model may include a first PMI object indicating a first type of PMI data, such as a length of the part; a second PMI object indicating a second type of PMI data, such as a length of an indention of the part; a third PMI object indicating a third set of PMI data, such as dimensions and tolerances of a beveled edge of the part; and the like.

In some embodiments, the drawing or model of a part or assembly may be associated with one or more attributes. As used herein, "attributes" refers to one or more characteristics associated with the entire part or drawing. For example, a part or assembly may be associated with a first attribute indicative of a description (of the part or assembly), a second attribute indicative of the drawing type (of the part or assembly), a third attribute indicative of the export class (of the part or assembly), and/or a fourth attribute indicative of an internal classification (of the part or assembly), or any alternative or additional attribute. It should be understood that in some embodiments, the attributes associated with an entire part or drawing may include PMI data.

Generally, an engineer (e.g., person developing the part and its features) manually assigns PMI objects to a part. The engineer may label the features of a part with PMI objects, defining sizes, units of measurement, tolerances, and so forth, which may aid in manufacturing the part. For example, one of the PMI objects may indicate the dimensions of the through-hole. However, one or more of those through-holes may accidentally not have been labeled with the appropriate PMI object due to engineer (e.g., human) error associated with manually assigning appropriate PMI objects to the through-hole features. As such, a portion of the PMI objects may be deficient because some PMI objects may be missing from the drawing of the part, some of the PMI objects may have been incorrectly labeled, and so forth.

Additionally or alternatively, the engineer may manually assign attributes to a part or assembly. In one implementation, the engineer may make a selection within the CAD program to cause a window for labeling the part or assembly. The window may include one or more fields for specifying corresponding attributes. For example, the window may include a first field for specifying a first attribute (e.g., a description of the part or assembly), a second field for specifying a second attribute (e.g., a drawing type of the part or assembly), a third field for specifying a third attribute (e.g., the export class of the part or assembly), and/or a fourth field for specifying a fourth attribute (e.g., the internal classification of the part or assembly), and so forth. However, one or more of those attributes may accidentally not have been properly labeled with the appropriate attribute due to engineer (e.g., human) error associated with filling out fields for specifying corresponding attributes. As such, a portion of the attributes may be deficient because the part or assembly may be assigned incorrect attribute, which may affect the manufacturing, verification, validation, tracking of the part or assembly, and so forth.

Since a rendering of a part or assembly may include these PMI objects and/or attributes and be used as manufacturing instructions, inaccuracies with regard to the attributes or PMI objects may lead to manufacturing issues, such as an inaccurately manufactured portions of the part or assembly. Manually labeling a part with PMI objects may be a time consuming process, give rise to human error, and be less efficient than if the process of labeling a part with PMI objects (e.g., or assigning a part with PMI objects) were otherwise automated.

To increase efficiency and/or prevent the inaccuracies that may otherwise result from having an engineer manually label a drawing with suitable PMI objects or manually specify attributes of a part or assembly, present embodiments include systems and methods for automatically assigning attributes to a model (of a part or assembly) and/or automatically assigning PMI objects to a model without dependency on human subjectivity. In this manner, present embodiments help transform a traditionally subjective process of assigning PMI objects and/or attributes, traditionally performed by humans, into a mathematically automated process that executable via a process-based device.

In particular, with regard to automatically assigning PMI objects, the CAD system may receive or identify a model with missing PMI objects. In one embodiment, the model with missing PMI objects may be newly created or recently imported, such that the model does not include PMI objects, includes only a subset of the total PMI objects, and/or includes deficient (e.g., invalid, incomplete, etc.) PMI objects. The CAD system may query a database accessible to the CAD system to identify PMI objects corresponding to a reference model (e.g., stored in the database) that includes similar features as the received model with missing PMI objects. To facilitate discussion, it should be understood that "the deficient model," when discussed in the context of automatically assigning PMI objects, may refer to a model that is deficient with respect to PMI objects because it does not include PMI objects, or because a portion of the PMI objects are inaccurate or have been omitted. Alternatively, a "reference model" refers to an existing model (e.g., stored in a database) that includes suitable PMI objects and/or attributes. The CAD system may determine which features of the reference model substantially match corresponding features of the deficient model (e.g., the model with missing PMI objects), as described in detail below. The CAD system may then assign PMI objects associated with the features of the reference model (determined to substantially match) to the corresponding features of the deficient model. In this manner, the CAD system may leverage reference models with PMI objects to automatically label similar features in other models with associated PMI objects included in the reference models. Further, as used herein, a "complete model" may refer to the initially deficient model that has been remedied to include the appropriate PMI objects (e.g., assigned from and/or based on the reference model).

With regard to automatically assigning attributes, the CAD system may identify a model deficient with respect to being associated to suitable attributes. To facilitate discussion, it should be understood that "the deficient model," when discussed in the context of automatically assigning attributes, may refer to a model that is deficient with respect to attributes because it does not include attributes, or because a portion of the attributes are inaccurate or have been omitted. As used herein, "expected attributed" may refer to an attribute that the model is expected to have (e.g., due to the features in the model, the type of model, etc.), but is instead missing. In one embodiment, the deficient model (e.g., the model with missing attributes) may be a newly created model, a recently imported model, or a model determined to be stored in the database (accessible to the CAD system), but missing certain assigned attributes. In response to determining that the deficient model is missing at least a portion of attributes, the CAD system may analyze the deficient model to determine a set of characteristics (e.g., physical characteristics, such as the shape of one or more faces, the dimensions of the one or more faces, etc.) of the deficient model. The CAD system may then identify similar reference models that include associated attributes and have a similar set of characteristics. The CAD system may then identify at least a subset of proposed attributes of the reference model to assign the deficient model based upon the similarities (e.g., geometric similarities) between the deficient model and the reference model. In this manner, the CAD system may leverage reference models (e.g., models with associated attributes) to automatically assign proposed attributes from the reference model to the deficient model. Labeling the deficient model to include proposed attributes may include assigning characters (e.g., text, symbols, numbers, etc.) to corresponding fields in a table of attributes, as described in detail below. Further, as used herein, a "complete model" may refer to the initially deficient model that has been remedied to include the appropriate attributes (e.g., assigned from and/or based on the reference model).

With the foregoing in mind, it may be useful to describe a computer-aided technologies (CAx) system that may incorporate the techniques described herein, for example to improve the generation of PMI objects on part drawings or to improve the assignment of attributes to a part. Accordingly, FIG. 1 illustrates an embodiment of a CAx system 10 suitable for providing for a variety of processes, including product lifecycle management (PLM) processes 12, 14, 16, 18, 20, 22. In the depicted embodiment, the CAx system 10 may include support for execution of conception processes 12. For example, the conception processes 12 may produce a set of specifications such as requirements specifications documenting a set of requirements to be satisfied by a system, a part, a product, or a combination thereof. The conception processes 12 may also produce a concept or prototype for the part or product (e.g., machine). A series of development processes 14 may then use the specifications and/or prototype to produce, for example, one or more 3D models (e.g., development models) of the part or product. The 3D models may include solid/surface modeling, parametric models, wireframe models, vector models, non-uniform rational basis spline (NURBS) models, geometric models, 2D manufacturing part and assembly drawings, and the so forth.

Development models may then be further refined and added to via the execution of development/engineering processes 16. The development/engineering processes may, for example, create and apply models such as thermodynamic models, low cycle fatigue (LCF) life prediction models, multibody dynamics (MBD) and kinematics models, computational fluid dynamics (CFD) models, finite element analysis (FEA) models, and/or 3-dimension to 2-dimension FEA mapping models that may be used to predict the behavior of the part or product during its operation. For example, turbine blades may be modeled to predict fluid flows, pressures, clearances, and the like, during operations of a gas turbine engine. The development/engineering processes 16 may additionally result in tolerances, materials specifications (e.g., material type, material hardness), clearance specifications, and the like.

The CAx system 10 may additionally provide for manufacturing processes 18 that may include manufacturing automation support. For example, additive manufacturing models may be derived, such as 3D printing models for material jetting, binder jetting, vat photopolymerization, powder bed fusion, sheet lamination, directed energy deposition, material extrusion, and the like, to create the part or product. Other manufacturing models may be derived, such as computer numeric control (CNC) models with G-code to machine or otherwise remove material to produce the part or product (e.g., via milling, lathing, plasma cutting, wire cutting, and so on). Bill of materials (BOM) creation, requisition orders, purchasing orders, and the like, may also be provided as part of the manufacture processes 18 (or other PLM processes).

The CAx system 10 may additionally provide for verification and/or validation processes 20 that may include automated inspection of the part or product as well as automated comparison of specifications, requirements, and the like. In one example, a coordinate-measuring machine (CMM) process may be used to automate inspection of the part, assembly, or product. After the part is inspected, results from the CMM process may be automatically generated via an electronic Characteristic Accountability & Verification (eCAV) system.

A servicing and tracking set of processes 22 may also be provided via the CAx system 10. The servicing and tracking processes 22 may log maintenance activities for the part, part replacements, part life (e.g., in fired hours), and so on. As illustrated, the CAx system 10 may include feedback between the processes 12, 14, 16, 18, 20, 22. For example, data from services and tracking processes 22, for example, may be used to redevelop the part or product via the development processes 14. Indeed, data from any one of the processes 12, 14, 16, 18, 20, 22 may be used by any other of the processes 12, 14, 16, 18, 20, 22 to improve the part or product or to create a new part or a new product. In this manner, the CAx system 10 may incorporate data from downstream processes and use the data to improve the part or to create a new part.

The CAx system 10 may additionally include one or more processors 24 and a memory system 26 that may execute software programs to perform the disclosed techniques. Moreover, the processors 24 may include multiple microprocessors, one or more "general-purpose" microprocessors, one or more special-purpose microprocessors, and/or one or more application specific integrated circuits (ASICS), or some combination thereof. For example, the processors 24 may include one or more reduced instruction set (RISC) processors. The memory system 26 may store information such as control software, look up tables, configuration data, etc. The memory system 26 may include a tangible, non-transitory, machine-readable medium, such as a volatile memory (e.g., a random-access memory (RAM)) and/or a nonvolatile memory (e.g., a read-only memory (ROM), flash memory, a hard drive, or any other suitable optical, magnetic, or solid-state storage medium, or a combination thereof).

Figure 2:
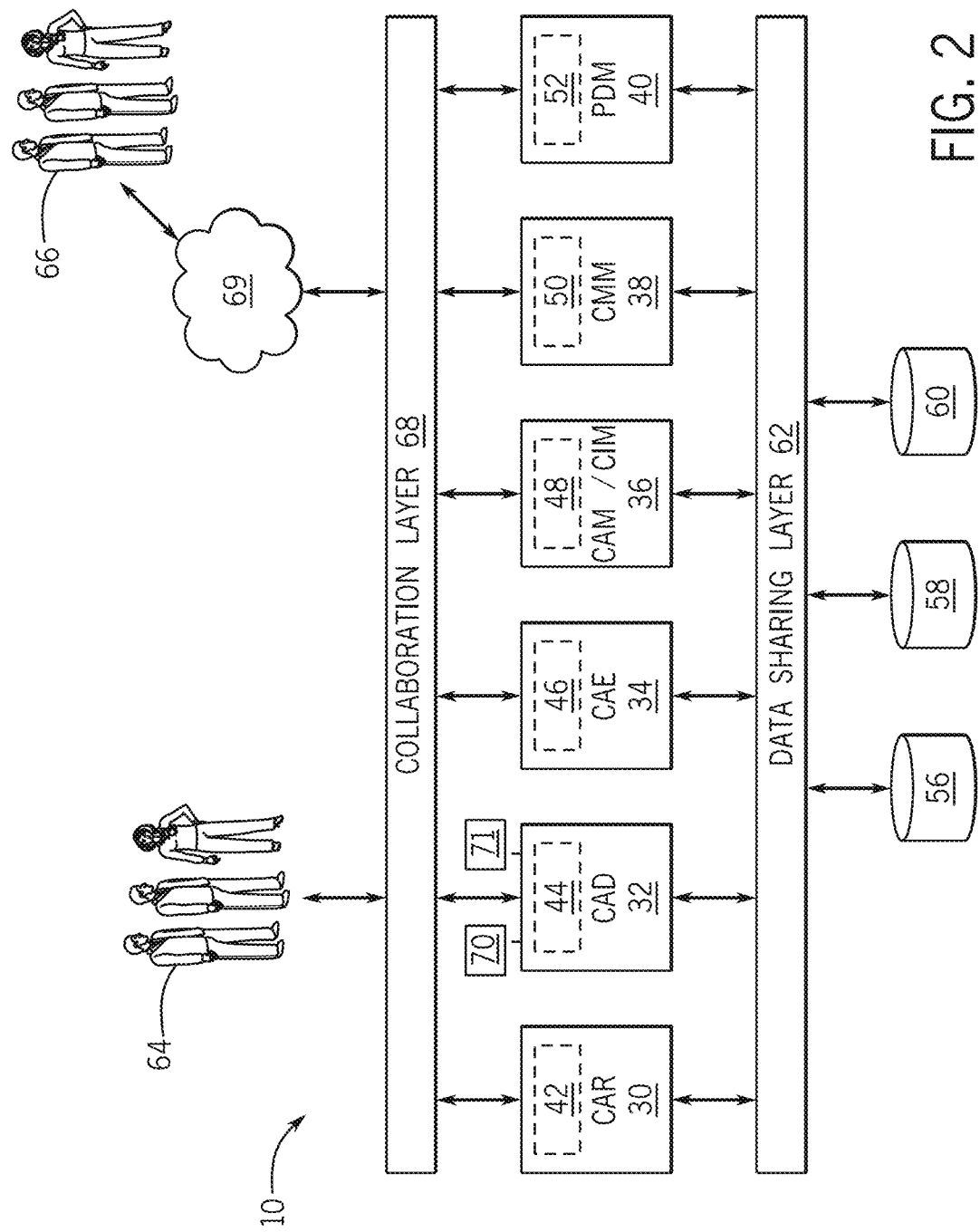
FIG. 2 is a block diagram of a certain components of the CAx system of FIG. 1, in accordance with an aspect of the present disclosure.

The memory system 26 may store a variety of information, which may be suitable for various purposes. For example, the memory system 26 may store machine-readable and/or processor-executable instructions (e.g., firmware or software) for the processors' 24 execution. In one embodiment, the executable instructions include instructions for a number of CAx based systems, for example software systems, as shown in the embodiment of FIG. 2. More specifically, the CAx system 10 embodiment illustrates a computer-aided requirements capture (CAR) system 30, a computer-aided design (CAD) system 32, a computer-aided engineering (CAE) system 34, computer-aided manufacturing/computer-integrated manufacturing (CAM/CIM) system 36, a coordinate-measuring machine (CMM) system 38, and a product data management (PDM) system 40. Each of the systems 30, 32, 34, 36, 38 and 40 may be extensible and/or customizable; accordingly, each system 30 may include an extensibility and customization system 42, 44, 46, 48, 50, and 52, respectively. Additionally, each of the systems 30, 32, 34, 36, 38 and 40 may be stored in a memory system, such as memory system 26, and may be executable via a processor, such as via processors 24.

In the depicted embodiment, the CAR system 30 may provide for entry of requirements and/or specifications, such as dimensions for the part or product, operational conditions that the part or product is expected to encounter (e.g., temperatures, pressures), certifications to be adhered to, quality control requirements, performance requirements, and so on. The CAD system 32 may provide for a graphical user interface suitable to create and manipulate graphical representations of 2D and/or 3D models as described above with respect to the development processes 14. For example, the 3D models may include solid/surface modeling, parametric models, wireframe models, vector models, non-uniform rational basis spline (NURBS) models, geometric models, and the like. The CAD system 32 may provide for the creation and update of the 2D and/or 3D models and related information (e.g., views, drawings, annotations, notes, PMI object, etc.). Indeed, the CAD system 32 may combine a graphical representation of the part or product with other, related information. Further, the CAD system 32 may create the PMI data and/or objects displayed on various renderings or MBDs. As disclosed below, in some embodiments, the CAD system 32 may identify relevant PMI objects or attributes from a first model (e.g., a reference model) to apply to a second model (e.g., a deficient model).

The CAE system 34 may enable creation of various engineering models, such as the models described above with respect to the development/engineering processes 16.

For example, the CAE system 34 may apply engineering principles to create models such as thermodynamic models, low cycle fatigue (LCF) life prediction models, multibody dynamics (MBD) and kinematics models, computational fluid dynamics (CFD) models, finite element analysis (FEA) models, and/or 3-dimension to 2-dimension FEA mapping models. The CAE system 34 may then apply the aforementioned models to analyze certain part or product properties (e.g., physical properties, thermodynamic properties, fluid flow properties, and so on), for example, to better match the requirements and specifications for the part or product.

The CAM/CIM system 36 may provide for certain automation and manufacturing efficiencies, for example, by deriving certain programs or code (e.g., G-code) and then executing the programs or code to manufacture the part or product. The CAM/CIM system 36 may support certain automated manufacturing techniques, such as additive (or subtractive) manufacturing techniques, including material jetting, binder jetting, vat photopolymerization, powder bed fusion, sheet lamination, directed energy deposition, material extrusion, milling, lathing, plasma cutting, wire cutting, or a combination thereof. The CMM system 38 may include machinery to automate inspections. For example, probe-based, camera-based, and/or sensor-based machinery may automatically inspect the part or product to ensure compliance with certain geometries, tolerances, shapes, and so on.

The PDM system 40 may be responsible for the management and publication of data from the systems 30, 32, 34, 36, and/or 38. For example, the systems 30, 32, 34, 36, and/or 38 may communicate with data repositories 56, 58, 60 via a data sharing layer 62. The PDM system 40 may then manage collaboration between the systems 30, 32, 34, 36, and/or 38 by providing for data translation services, versioning support, archive management, notices of updates, and so on. The PDM system 40 may additionally provide for business support such as interfacing with supplier/vendor systems and/or logistics systems for purchasing, invoicing, order tracking, and so on. The PDM system 40 may also interface with service/logging systems (e.g., service center data management systems) to aid in tracking the maintenance and life cycle of the part or product as it undergoes operations. Teams 64, 66 may collaborate with team members via a collaboration layer 68. The collaboration layer may include web interfaces, messaging systems, file drop/pickup systems, and the like, suitable for sharing information and a variety of data. The collaboration layer 68 may also include cloud-based systems 69 or communicate with the cloud-based systems 69 that may provide for decentralized computing services and file storage. For example, portions (or all) of the systems 30, 32, 34, 36, 38, 40 may be stored in the cloud 69 and/or accessible via the cloud 69.

The extensibility and customization systems 42, 44, 46, 48, 50, and 52 may provide for functionality not found natively in the CAR system 30, the CAD system 32, the CAM/CIM system 36, the CMM system 38 and/or the PDM system 40. For example, computer code or instructions may be added to the systems 30, 32, 34, 36, 38, and/or 40 via shared libraries, modules, software subsystems and the like, included in the extensibility and customization systems 42, 44, 46, 48, 50, and/or 52. The extensibility and customization systems 42, 44, 46, 48, 50, and 52 may also use application programming interfaces (APIs) included in their respective systems 30, 32, 34, 36, 38, and/or 40 to execute certain functions, objects, shared data, software systems, and so on, useful in extending the capabilities of the CAR system 30, the CAD system 32, the CAM/CIM system 36, the CMM system 38 and/or the PDM system 40. By enabling the processes 12, 14, 16, 18, 20, and 22, for example, via the systems 30, 32, 34, 36, 38, and/or 40 and their respective extensibility and customization systems 42, 44, 46, 48, 50, and 52, the techniques described herein may provide for a more efficient "cradle-to-grave" product lifecycle management.

For example, the extensibility and customization system 44 of the CAD system 32 may be used to copy attributes or PMI objects from a reference model 70 (e.g., existing model) into a deficient model 71 and/or another model. The reference model 70 may be stored in the data repositories 56, 58, and/or 60. The extensibility and customization system 44 may identify certain objects or entities in the reference model 70 that correspond to objects or entities in the deficient model 71, such as holes, pockets, groves, slots, faces, edges, holes, shapes (e.g., geometric shapes, curves), and so on, and then automatically assign PMI objects associated with the features or entities identified into the deficient model. In one embodiment, the assigned PMI objects may be based on a predefined library including information of reference models 70.

Figure 3:
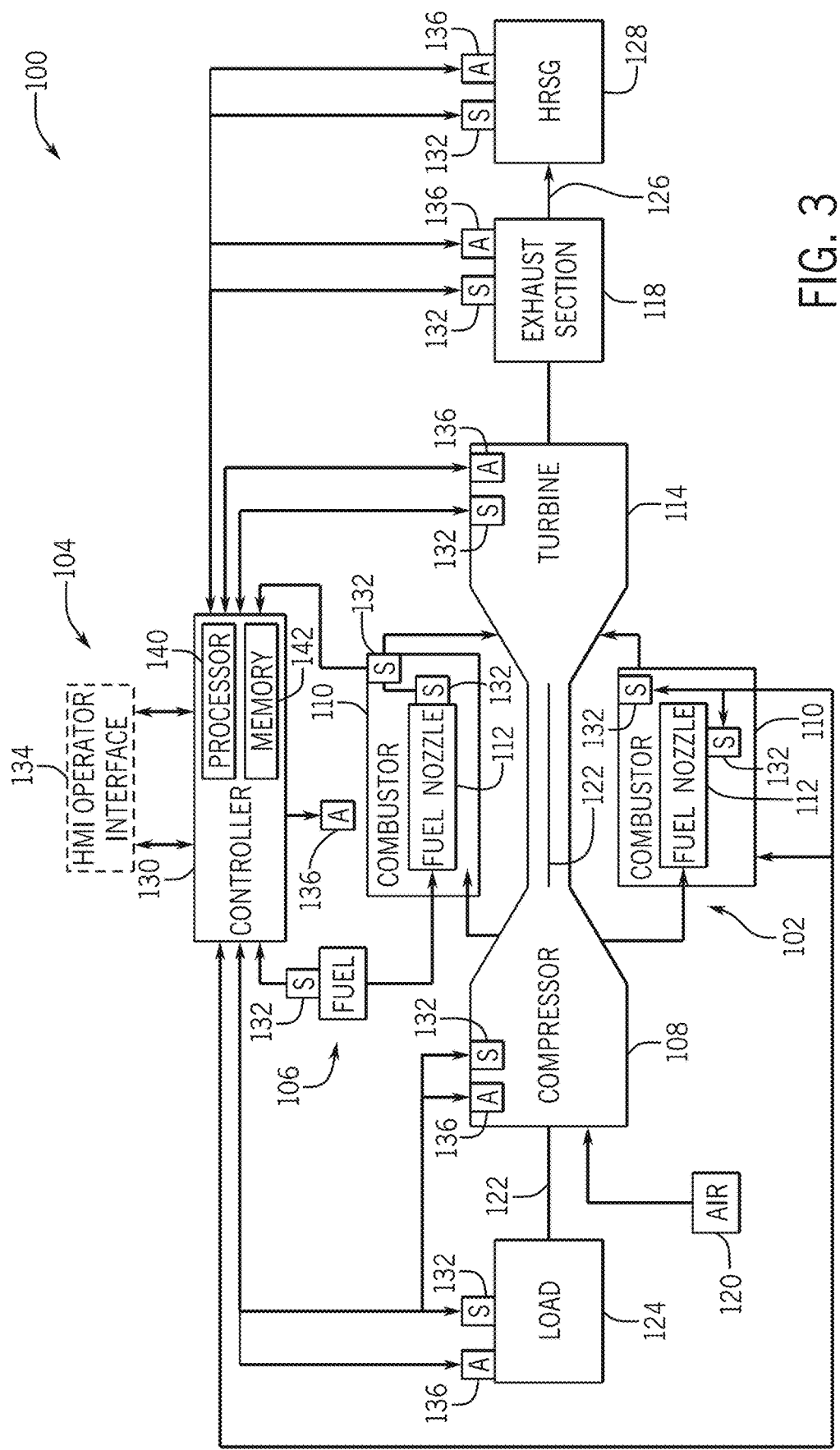
FIG. 3 is block diagram of an industrial system that may be conceived, developed, engineered, manufactured, and/or service and tracked by the CAx system of FIG. 1, in accordance with an aspect of the present disclosure.

It may be beneficial to describe a machine that may incorporate one or more parts manufactured and tracked by the processes 12, 14, 16, 18, 20, and 22, for example, via the CAx system 10. Accordingly, FIG. 3 illustrates an example of a power production system 100 that may be entirely (or partially) conceived, developed, engineered, manufactured, serviced, and tracked by the CAx system 10. As illustrated in FIG. 1, the power production system 100 includes a gas turbine system 102, a monitoring and control system 104, and a fuel supply system 106. The gas turbine system 102 may include a compressor 108, combustion systems 110, fuel nozzles 112, a gas turbine 114, and an exhaust section 118. During operation, the gas turbine system 102 may pull air 120 into the compressor 108, which may then compress the air 120 and move the air 120 to the combustion system 110 (e.g., which may include a number of combustors). In the combustion system 110, the fuel nozzle 112 (or a number of fuel nozzles 112) may inject fuel that mixes with the compressed air 120 to create, for example, an air-fuel mixture.

The air-fuel mixture may combust in the combustion system 110 to generate hot combustion gases, which flow downstream into the turbine 114 to drive one or more turbine stages. For example, the combustion gases may move through the turbine 114 to drive one or more stages of turbine blades, which may in turn drive rotation of a shaft 122. The shaft 122 may connect to a load 124, such as a generator that uses the torque of the shaft 122 to produce electricity. After passing through the turbine 114, the hot combustion gases may vent as exhaust gases 126 into the environment by way of the exhaust section 118. The exhaust gas 126 may include gases such as carbon dioxide ($CO_2$), carbon monoxide (CO), nitrogen oxides ($NO_x$), and so forth.

The exhaust gas 126 may include thermal energy, and the thermal energy may be recovered by a heat recovery steam generation (HRSG) system 128. In combined cycle systems, such as the power plant 100, hot exhaust 126 may flow from the gas turbine 114 and pass to the HRSG 128, where it may be used to generate high-pressure, high-temperature steam. The steam produced by the HRSG 128 may then be passed through a steam turbine engine for further power generation. In addition, the produced steam may also be supplied to any other processes where steam may be used, such as to a gasifier using the fuel to produce the untreated syngas. The gas turbine engine generation cycle is often referred to as the "topping cycle," whereas the steam turbine engine generation cycle is often referred to as the "bottoming cycle." Combining these two cycles may lead to greater efficiencies in both cycles. In particular, exhaust heat from the topping cycle may be captured and used to generate steam for use in the bottoming cycle.

In certain embodiments, the system 100 may also include a controller 130. The controller 130 may be communicatively coupled to a number of sensors 132, a human machine interface (HMI) operator interface 134, and one or more actuators 136 suitable for controlling components of the system 100. The actuators 136 may include valves, switches, positioners, pumps, and the like, suitable for controlling the various components of the system 100. The controller 130 may receive data from the sensors 132, and may be used to control the compressor 108, the combustors 110, the turbine 114, the exhaust section 118, the load 124, the HRSG 128, and so forth.

In certain embodiments, the HMI operator interface 134 may be executable by one or more computer systems of the system 100. A plant operator may interface with the industrial system 100 via the HMI operator interface 134. Accordingly, the HMI operator interface 134 may include various input and output devices (e.g., mouse, keyboard, monitor, touch screen, or other suitable input and/or output device) such that the plant operator may provide commands (e.g., control and/or operational commands) to the controller 130.

The controller 130 may include a processor(s) 140 (e.g., a microprocessor(s)) that may execute software programs to perform the disclosed techniques. Moreover, the processor 140 may include multiple microprocessors, one or more "general-purpose" microprocessors, one or more special-purpose microprocessors, and/or one or more application specific integrated circuits (ASICS), or some combination thereof. For example, the processor 140 may include one or more reduced instruction set (RISC) processors. The controller 130 may include a memory device 142 that may store information such as control software, look up tables, configuration data, etc. The memory device 142 may include a tangible, non-transitory, machine-readable medium, such as a volatile memory (e.g., a random-access memory (RAM)) and/or a nonvolatile memory (e.g., a read-only memory (ROM), flash memory, a hard drive, or any other suitable optical, magnetic, or solid-state storage medium, or a combination thereof).

Figure 4:
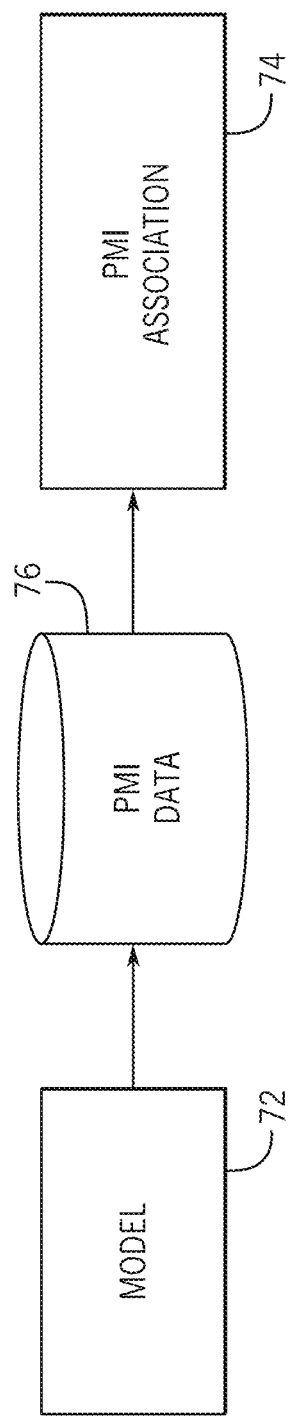
FIG. 4 is a general block diagram illustrating an embodiment of the CAx system components interacting to generate a Product and Manufacturing Information (PMI) association, in accordance with an aspect of the present disclosure.

Drawings and/or models for the aforementioned parts of the industrial machinery may be generated to aid in the processes 12, 14, 16, 18, 20, and 22, for example, via the CAx system 10. More specifically, the reference models 70 stored in a database may include PMI object (e.g., text indicative of PMI data associated with features of the part) or be associated with one or more attributes. FIG. 4 is a general block diagram illustrating an embodiment of the CAD system 32, which may generate a model 72, PMI associations 74, and/or PMI data 76. While only a discussion of associating PMI data 76 (present as PMI objects) to features of a model is provided (e.g., linking dimensions and labels to specific faces which need to be controlled with those characteristics), it should be understood that generally a similar approach may be used for associating attributes of a model.

With this in mind, the model 72 generated by the CAD system 32 may be a drawing of a part or an assembly of industrial machinery, for example. That is, a model 72 may be a 3D representation of the part that may be manipulated and/or oriented to any given view on the CAD system 32 via inputs to a user interface on the CAD system 32. In one embodiment, the user interface may include an arrow that may be used (e.g., via a user input like a computer mouse) to manipulate and/or orient the model 72 of a part to a specified view. Present embodiments include assigning PMI objects associated with the features of the reference model 70 (determined to substantially match) to the corresponding features of the model with missing PMI objects, as described in detail below. In some embodiments, information indicative of the PMI data corresponding to the PMI object of the reference model 70 may be stored in a database (e.g., predefined library), such that the CAD system 32 may query the database to retrieve and assign PMI data to a deficient model 71. Additional embodiments include assigning attributes to models 72 with missing attributes.

PMI associations 74 may associate PMI data 76 of PMI objects with corresponding features of a reference model 70. PMI associations 74 may link PMI data 76 to features (e.g., physical features in the model 72), such that the PMI data 76 may be present on the model 72 as PMI objects corresponding to those features. In more detail, a feature is any characteristic of model 72. Such features may include, for example, a hole with specific dimensions, chamfered edge sizes, welding specifications, and/or any other features that may be developed (e.g., manufactured) into a part or be inherent to the part. In some embodiments, the PMI associations 74 may associate PMI data 76 to respective features of the model 72. The model 72, the PMI associations 74, and/or the PMI data 76 may be stored in the memory, the data-sharing layer, or the database (e.g., predefined library) mentioned above. As mentioned above, PMI data 76 may include any description of the feature that may be manufactured into a part.

In certain embodiments, the generated PMI associations 74 may be compiled and stored as PMI data 76 in the memory and/or the database (e.g., predefined library) mentioned above. That is, the PMI associations 74, their respective features, and so forth, may be stored as part of the PMI data 76. PMI objects displayed on the model may be generated based on the PMI data 76 and PMI associations (e.g., to recreate PMI objects and to display PMI objects properly). The PMI object may include a visual indication, including a text description of the corresponding feature on the model of the part. For example, a PMI object for a given through-hole (e.g., or any other feature) may include, as an annotation displayed on the model, text indicating the dimensions (e.g., radius, thread sizes, and/or any other PMI) of the hole. The PMI data 76 may be retrieved by the processor of the CAD system 32 to generate drawings with PMI objects (e.g., text indicative of PMI associated with a part and/or feature).

Figure 5:
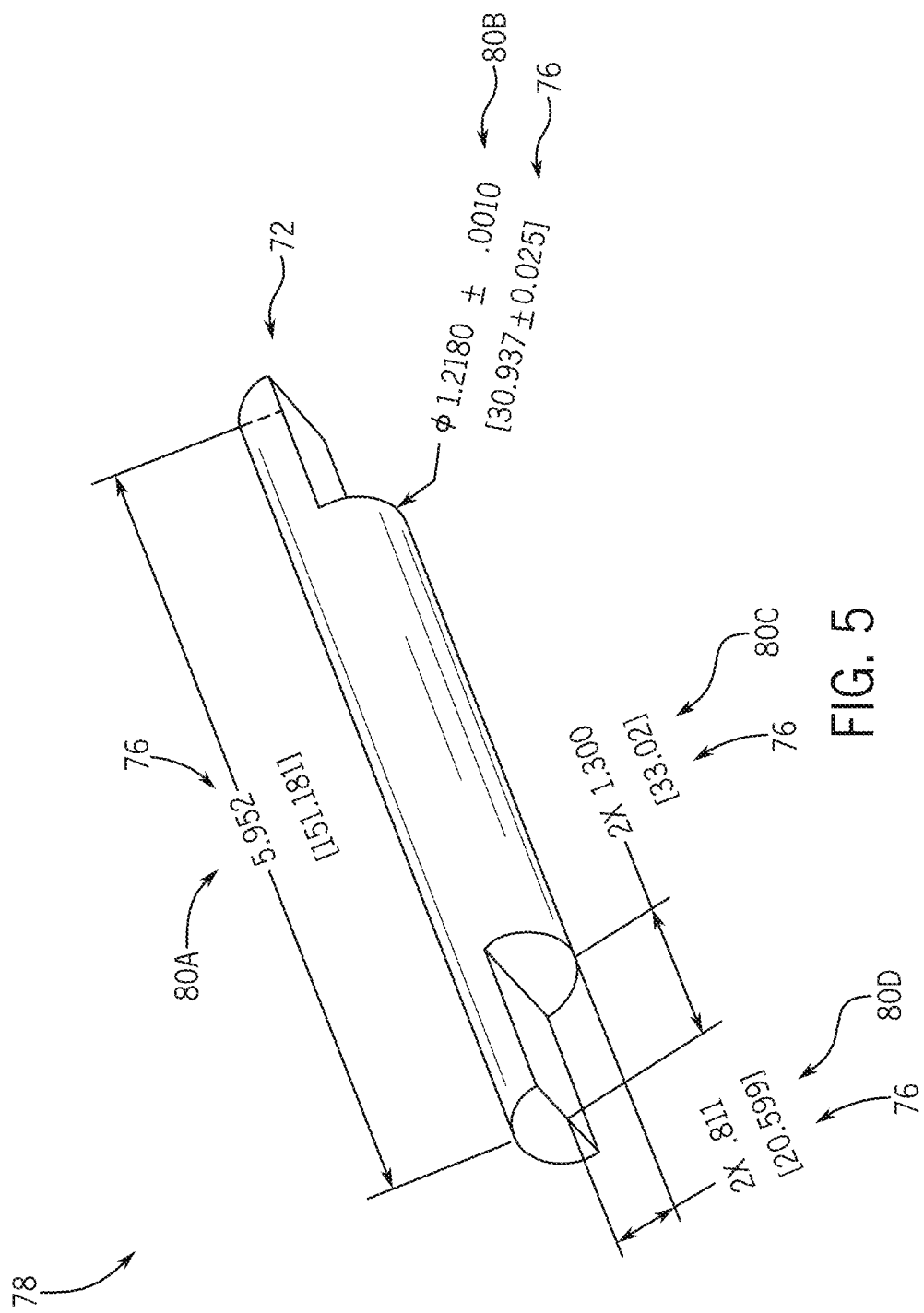
FIG. 5 is a schematic diagram of an embodiment of a part that includes PMI objects and generated using the CAD system, in accordance with an aspect of the present disclosure.

FIG. 5 is a schematic diagram of an embodiment of a part 78 generated using the CAD system 32 to include PMI objects 80, in accordance with an aspect of the present disclosure. As illustrated, the PMI objects 80 include PMI data 76 for a corresponding feature. In the illustrated embodiment, a first PMI object 80A includes PMI data 76 indicative of the part length, a second PMI 80B object includes PMI data 76 indicative of a diameter and acceptable tolerances, a third PMI object 80C includes PMI data 76 indicative of an indention length, and a fourth PMI object 80D includes PMI data 76 indicative of a height of the indention. The PMI objects 80 may provide PMI data 76 useful in manufacturing the part 78. In some embodiments, and as discussed in detail below with regard to FIGS. 9 and 10, the CAD system 32 may receive a model 72 (of the part) with missing PMI objects. While the model 72 may be manually labeled, it may be desirable to automate the process of assigning PMI objects 80, for all the reasons discussed above.

Figure 6:
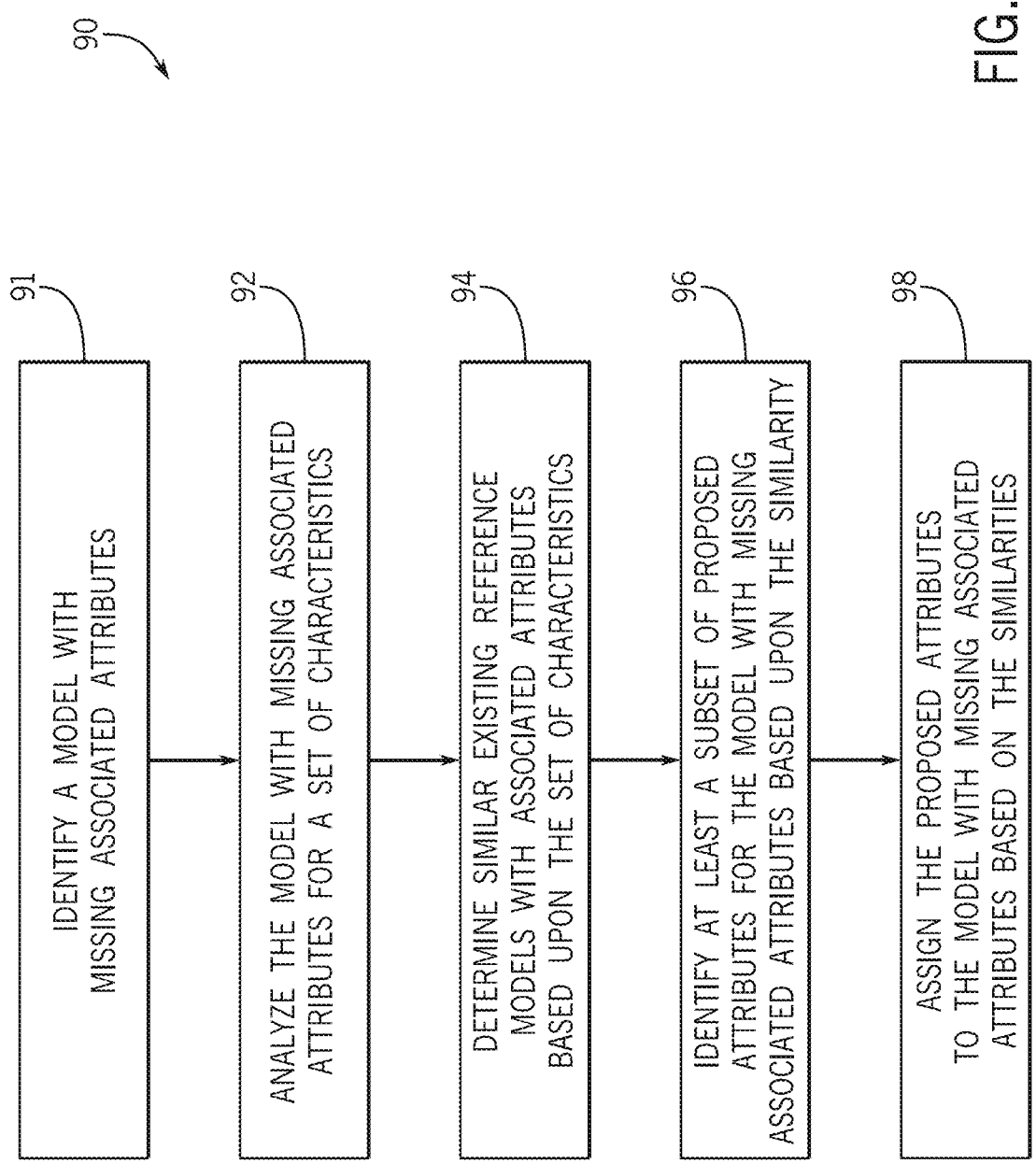
FIG. 6 is a flow diagram of a process for assigning attributes to a model with missing attributes, in accordance with an aspect of the present disclosure.

As discussed above, whereas PMI objects 80 provide PMI data 76 for corresponding features of a model of a part, "attributes" refers to one or more characteristics associated with the entire model of the part. In some embodiments, the CAD system 32 may receive a model with missing attributes (e.g., a deficient model). To that end, FIG. 6 is a flow diagram 90 of a process for assigning attributes to a deficient model (e.g., model with missing attributes), in accordance with an aspect of the present disclosure. The steps illustrated in the flow diagram 90 may be performed by one or more processors associated with the CAx system 10 for the purpose of managing models 72. Furthermore, the steps illustrated in the flow diagram 90 are meant to facilitate discussion and are not intended to limit the scope of this disclosure, since additional steps may be performed, certain steps may be omitted, and the illustrated steps may be performed in an alternative order.

The flow diagram 90 includes identifying (process block 91) a deficient model (e.g., a model with missing attributes). To facilitate discussion and as used herein, "associated attributes" refers to any attributes assigned to a model 72, and may serve to describe the entire model 72, for example, by specifying a description (of the part or assembly), a drawing type (of the part or assembly), an Export Control classification (of the part or assembly), an internal classification (of the part or assembly), and so forth. In some embodiments, identifying (process block 91) the deficient model 71 may include importing a new model and determining if the new model is a deficient model based on receiving a set of rules that outline steps for labeling the model as a deficient model. In one embodiment, the CAD system 32 employs these rules to determine if the model includes associated attributes and, if so, further determining if the associated attributes substantially match the attributes of a reference model 70. If the new model does not include associated attributes or if the associated attributes do not match the attributes of the reference models 70, then the CAD system 32 may proceed to assign proposed attributes to the deficient model 71 when possible, as described in detail below.

The flow diagram 90 includes analyzing (process block 92) the deficient model 71 for a set of characteristics to be used to identify relevant reference models to obtain attributes from. That is, in response to identifying (process block 91) the deficient model 71, the CAD system 32 may determine a set of characteristics. In certain embodiments, analyzing (process block 92) the deficient model 71 includes determining the geometrical characteristics of the deficient model 71. For example, the CAD system 32 may determine existence of characteristic features, such as slots, groves, cooling features, a shape of external faces of the model, a size of edges on the model, a thread count of threaded surfaces, the number of openings in the part, a volume of the model, total surface area of the model, the number of faces, the crinkliness, volumetric error, weighted point sets, deformations, and so forth. The CAD system 32 may leverage various feature recognition algorithms to analyze the deficient model 71.

While the step of analyzing (process block 92) the deficient model 71 is described in the context of analyzing the deficient model 71 for geometric characteristics, it should be understood that the CAD system 32 may analyze the deficient model 71 for any suitable characteristics by employing any suitable techniques. For example, the analysis of the deficient model 71 may be global feature-based; such that the moments, spherical harmonics, and so forth are employed/determined; manufacturing-based (e.g., MFG. FR-based), such that feature relationships are employed/determined; graph-based, such that boundary representation (B-rep) graphs, graph spectras, reeb graphs, skeletal graphs, and so forth, are employed/determined; histogram-based, such that shape histograms, shape distributions, and so forth, are employed/determined; product information-based, such that GT code, section images, and so forth, are employed/determined; and 3D object recognition based, such that aspect graphs, extended Gaussian images, and geometric hashtags are employed/determined; to name a few. Additionally or alternatively, analyzing (process block 92) the deficient model 71 may be based on 2D images (e.g., model views), numerical code, mathematical matrices, and text. In some embodiments, machine learning techniques may be employed to facilitate and/or enhance the efficiency of this analysis.

The flow diagram 90 includes identifying (process block 94) similar reference models 70 (e.g., models with associated attributes) based on the analysis (process block 92). In one embodiment, the CAD system 32 may query the database of reference models 70 and compare the characteristics of the deficient model 71 (e.g., based on the analysis [process block 92]) to corresponding characteristics of one or more reference models 70. In this manner, the CAD system 32 may identify or determine (process block 94) a reference model 70 that is substantially similar (e.g., within thresholds or predetermined levels of similarity, as discussed in detail below) to the model with missing associated attributes. For example, in response to the analysis (process block 92) of the deficient model 71, whereby the geometric characteristics, namely the surface-area-to-volume ratio, the number of faces, and the weighted point sets, are determined, the CAD system 32 may identify (process block 94) reference model(s) 70 that have a similar geometric characteristics.

In one embodiment, a reference model 70 is (process block 94) determined be to substantially similar to the deficient model 71 when the values corresponding to the geometric characteristics are within an acceptable standard deviation. For example, the reference model 70 is determined (process block 94) to substantially be similar to the deficient model 71 when the values of the geometric characteristics are within certain standard deviation thresholds.

In another example, the reference model 70 is determined (process block 94) to be substantially similar to the deficient model 71 when the values of the geometric characteristics are within percent error threshold value(s). In one embodiment, when the geometric characteristics of the reference model 70 are less than a one, two, five, or ten percent error from the values of the geometric characteristics of the deficient model 71, the reference model 70 is determined (process block 94) to be substantially similar to deficient model 71. It should be understood that the percent error threshold value(s) may be different for each geometric characteristic.

In yet another example, the reference model 70 is determined (process block 94) to substantially be similar to the deficient model 71 when a threshold percentage of the number of geometric characteristics are determined to be within the threshold percent error. For example, in response to the analyzing (process block 92) the deficient model 71 to determine fifty geometric characteristics, namely the surface-area-to-volume ratio, the number of faces, the weighted point sets, and so forth, the CAD system 32 may determine that an reference model 70 is substantially similar to the deficient model 71, when 90% of geometric characteristics are within acceptable percent error values. While this example is discussed in the context of analyzing 50 geometric characteristics to determine whether 90% of those geometric characteristics are within acceptable percent error values, it should be understood that in further embodiments the reference model 70 may be determined to be substantially similar to the deficient model 71 after analyzing (process block 92) any number of characteristics to determine whether any suitable percent (e.g., greater than 50%, 60%, 80% etc.) are within acceptable percent error values (e.g., less than 20%, 10%, 5%, 1%, etc.).

After identifying or determining (process block 94) a substantially similar reference model with associated attributes, the CAD system 32 may identify (process block 96) a subset of the proposed attributes in the reference model 70 to assign (process block 98) the deficient model 71, based on the determined (process block 94) similarities. In one embodiment, identifying (process block 96) the subset of proposed attributes to assign (process block 98) the model with missing attributes (e.g., the deficient model 71) may be based on the analysis (process block 92). For example, the CAD system 32 may determine if the new model is a deficient model based on receiving a set of rules that outline steps for labeling the model as a deficient model. For example, in response to determining that the deficient model 71 is missing two attribute fields in a corresponding table of attributes, the CAD system 32 may assign (process block 98) the proposed attributes to fill in the two missing attribute fields. In another example, the CAD system 32 may determine that the deficient model 71 has not been assigned any attributes, such that the attributes of the reference model 70 (determined to be substantially similar) are assigned (process block 98) to the deficient model 71.

In some embodiments, identifying (process block 96) a subset of the proposed attributes in the reference model 70 to assign to the deficient model 71 may include replacing the attributes associated with the deficient model 71 to ensure that the attributes of the reference model 70 match the attributes of the deficient model 71. That is, assigning (process block 98) the proposed attributes to the deficient model 71 may include replacing any existing attributes of the deficient model 71. In this manner, uniformity of all substantially similar models is achieved, which may enhance the consistency in manufacturing part and assemblies developed to have similar attributes.

Figure 7:
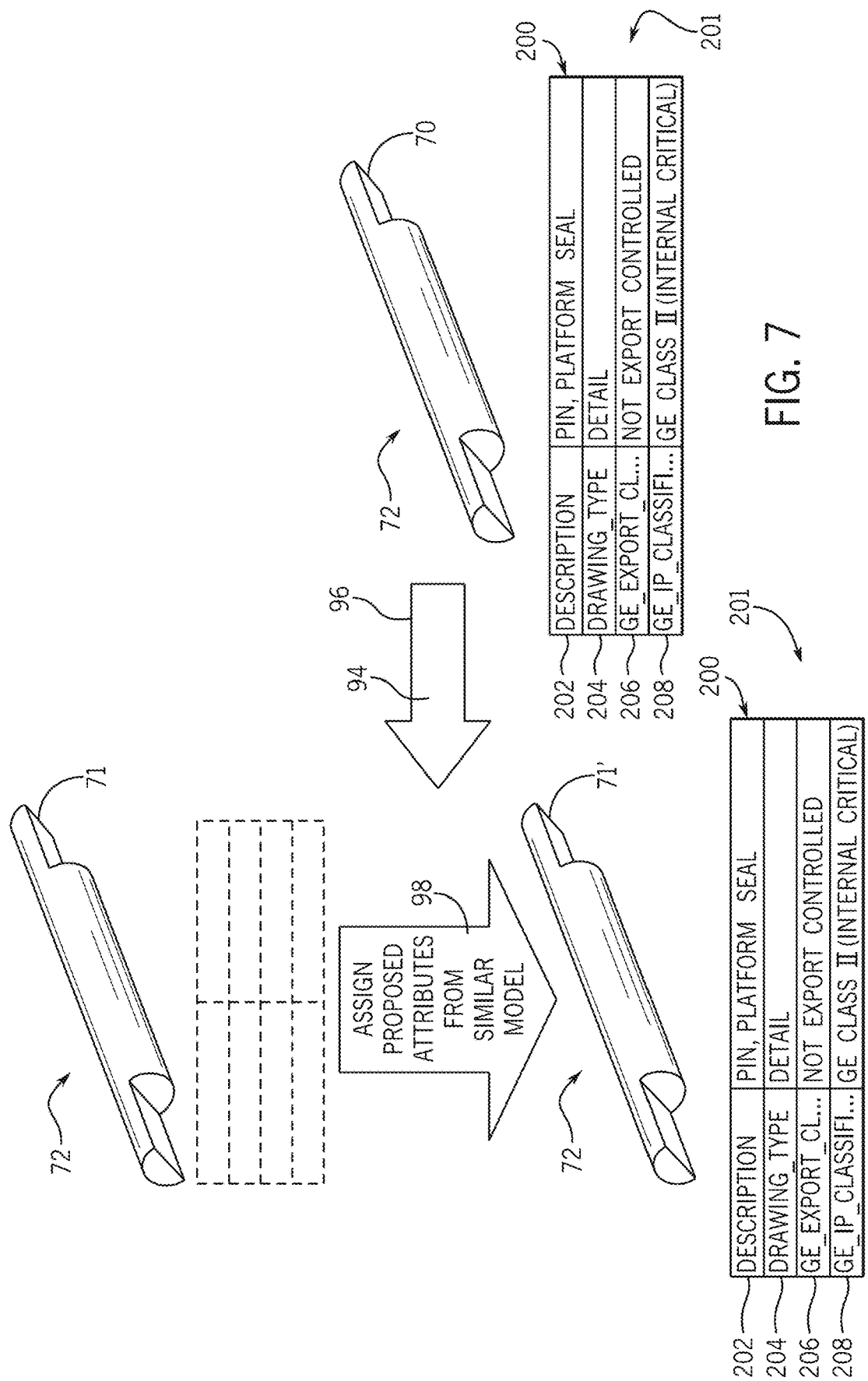
FIG. 7 is a progression of a deficient model that is initially missing attributes, but is later assigned attributes, in accordance with an aspect of the present disclosure.
Figure 8:
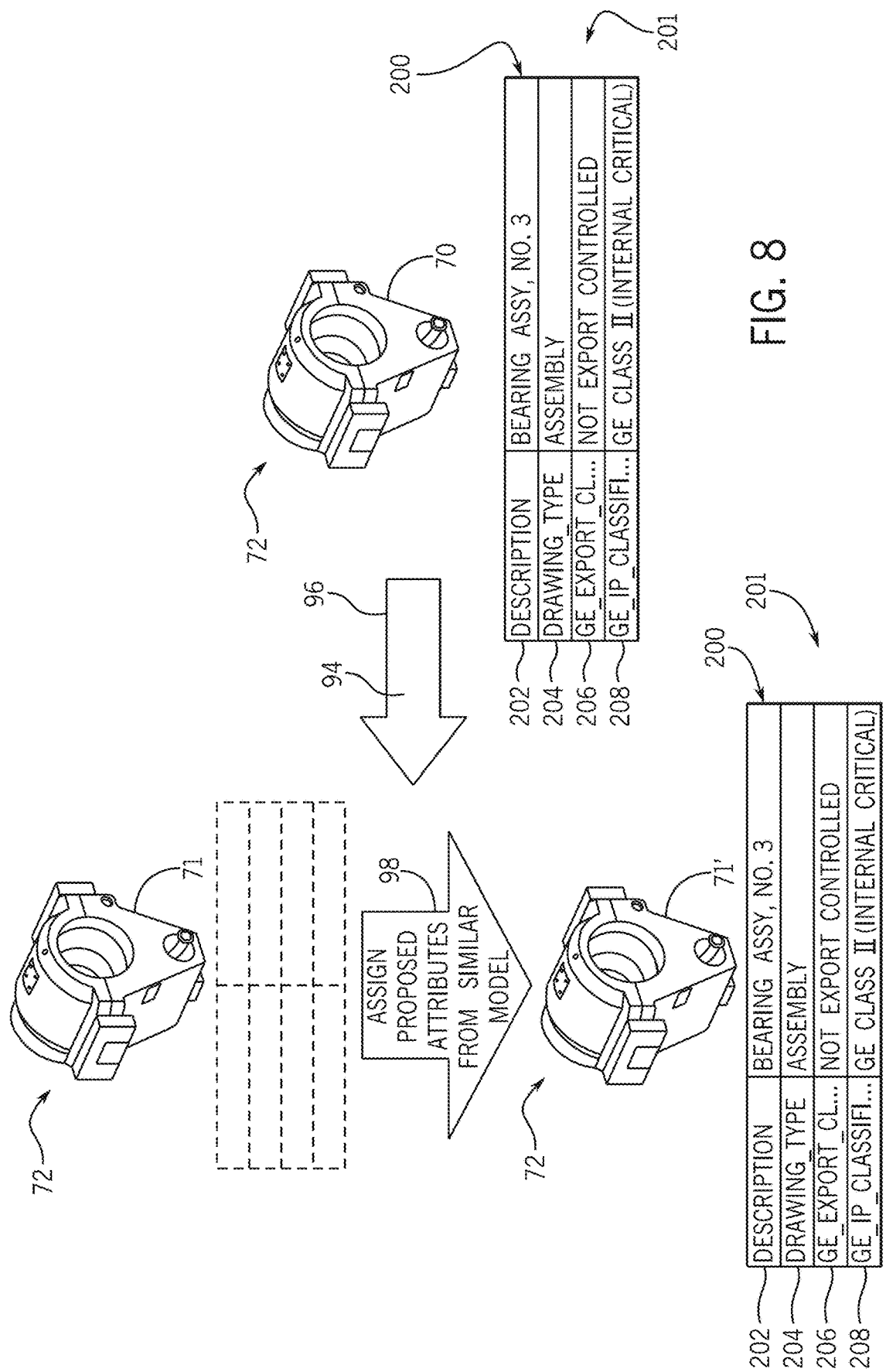
FIG. 8 is another progression of another deficient model that is initially missing attributes, but is later assigned attributes, in accordance with an aspect of the present disclosure.

To help illustrate, FIGS. 7 and 8 respectively illustrate a progression of a deficient model that is initially missing attributes, but is later assigned attributes 200 (e.g., becoming a complete model 71'), in accordance with an aspect of the present disclosure. In particular, the model 72 illustrated in FIG. 7 is a part, while the model 72 illustrated in FIG. 8 is an assembly. Indeed, the flow diagram 90 of FIG. 6 may be applied to a deficient model 71 that is a part or an assembly to assign (process block 98) proposed attributes 200. In the illustrated embodiments, the deficient model 71 does not include any attributes 200. After applying the process of assigning (process block 98) proposed attributes 200, the initially deficient model 71 becomes a complete model 71'. That is, after the deficient model 71 is assigned suitable attributes 200, the deficient model becomes identified as a complete model 71'. In one embodiment, the attributes may be presented as a table 201 in close proximity to the part, for example, when a drawing or MBD including PMI objects of the complete model 71' is generated.

In the illustrated embodiments, the model is assigned a first attribute 202 indicative of a description (in this example, "Pin, Platform Seal" for the part and "Bearing Assy, No. 3" for the assembly), a second attribute 204 indicative of the drawing type (in this example, "Detail" for the part and "Assembly" for the assembly), a third attribute 206 indicative of the export class (in this example, "Not Export Controlled" for the part and assembly), and a fourth attribute 208 indicative of an internal classification (in this example, "GE Class II (internal critical)" for the part and assembly), or any alternative or additional attribute. As mentioned above, it should be understood any additional or alternative attributes 200 may (process block 98) be assigned.

In some embodiments, the criterion for assigning (process block 98) proposed attributes 200 may differ depending on the model type. For example, the CAD system 32 may employ one criterion for a model of a part, but may employ another criterion for the model of an assembly. To that end, discussion of the flow diagram of FIG. 6 provided criterion for parts, such that the criterion may employ one or more thresholds with regard to similarity among features of a part. While the CAD system 32 may employ this approach for model of an assembly, in additional embodiments, the CAD model may determine similarity of a deficient model with respect to one or more reference models based on a common number of parts, geometric features, and so forth, between the deficient model and the one or more reference models.

Figure 9:
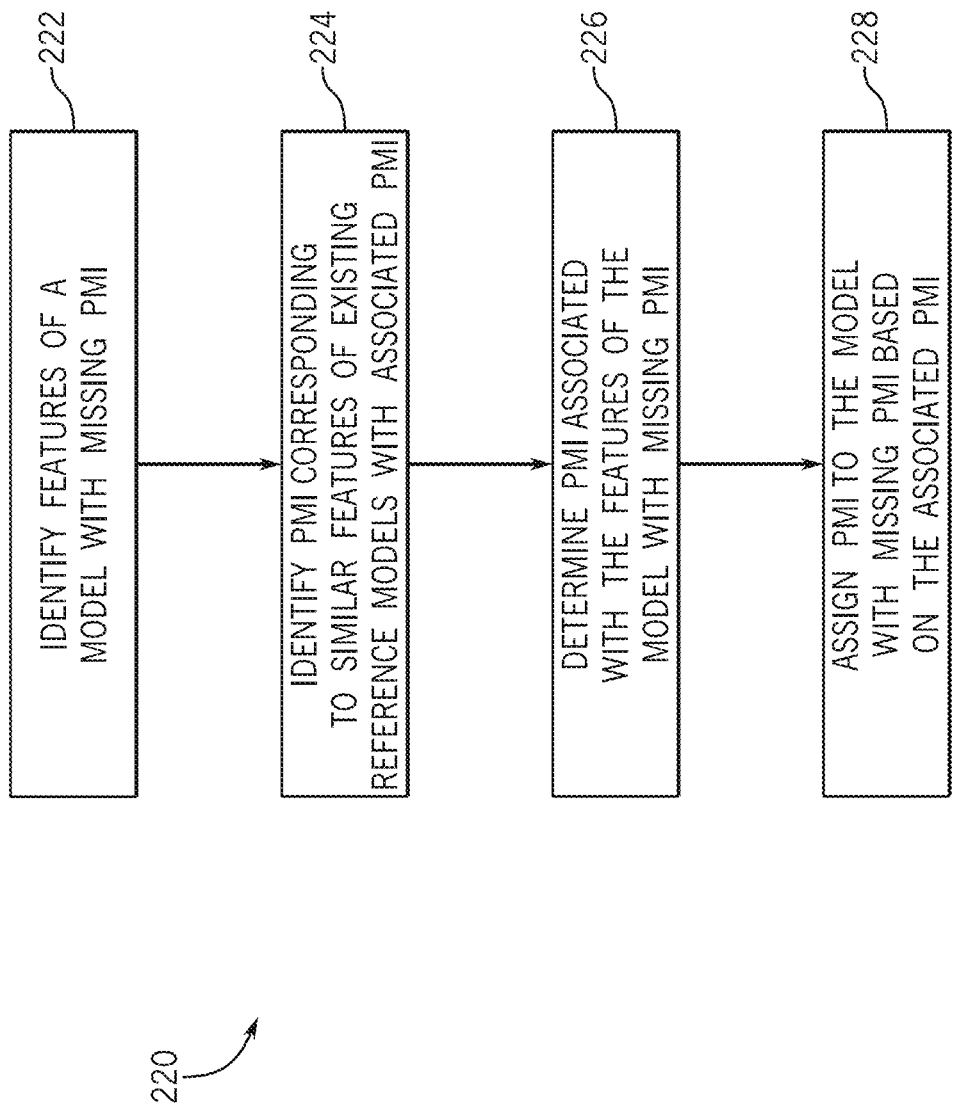
FIG. 9 is a flow diagram of a process for assigning PMI objects to a model, in accordance with an aspect of the present disclosure.

FIG. 9 is a flow diagram 220 of a process for assigning PMI objects 80 to a deficient model 71 (e.g., a model with missing PMI objects 80), in accordance with an aspect of the present disclosure. The steps illustrated in the flow diagram 220 may be performed by one or more processors associated with the CAx system 10 for the purpose of managing models 72 and assigning PMI objects to a deficient model 71. Furthermore, the steps illustrated in the flow diagram 90 are meant to facilitate discussion and are not intended to limit the scope of this disclosure, since additional steps may be performed, certain steps may be omitted, and the illustrated steps may be performed in an alternative order.

With this in mind, the flow diagram 220 includes identifying (process block 222) features of a deficient model 71 (e.g., a model with missing PMI objects 80). In some embodiments, the deficient model 71 may be stored in a database associated with the CAD system 32 or be a draft-in-progress model. In addition or alternatively, the deficient model 71 may be received by the CAD system 32. That is, the deficient model 71 may be a newly created or recently imported model 72, such that the deficient model 71 does not include PMI objects 80, includes only a subset of the total PMI objects 80, and/or includes deficient PMI objects 80.

In one embodiment, identifying (process block 222) features of a deficient model 71 may include analyzing the deficient model 71 to determine if features within the deficient model 71 have been assigned appropriate PMI objects 80. That is, in response to analyzing the deficient model 71, the CAD system 32 may determine whether the deficient model 71 is properly labeled with appropriate PMI objects 80. In one embodiment, determining whether the deficient model is properly labeled with appropriate PMI may include determining if the deficient model 71 includes PMI associations 74 that associate the proper PMI data 76 of respective PMI objects to appropriate features in the deficient model 71. If the CAD system 32 determines that the deficient model 71 lacks appropriate PMI objects 80, the CAD system 32 may identify (process block 222) the features (associated with the deficient model 71) that do not include PMI objects 80.

The CAD system 32 may leverage various feature recognition algorithms to analyze the deficient model 71 and identify (process block 224) PMI objects 80 corresponding to similar features of reference models 70 with PMI objects 80. In one embodiment, the CAD system 32 may query a database accessible to the CAD system 32 to identify PMI objects 80 corresponding to reference models 70 (e.g., stored in the database) that includes similar features as the model with missing PMI objects. In this manner, CAD system 32 may assign PMI objects to the deficient model 71 based on the database.

As mentioned above, PMI associations 74 may associate PMI data 76 of PMI objects 80 with corresponding features of a reference model 70. In another embodiment, the CAD system 32 may determine geometrical characteristics of the deficient model 71. For example, the CAD system 32 may determine a shape of external faces of the model, a size of edges on the model, a thread count of threaded surfaces, the number of openings in the part, a volume of the model, total surface area of the model, the number of faces, the crinkliness, volumetric error, weighted point sets, deformations, and so forth, and compare one or more of these geometric characteristics to reference models 70. It should be understood that the techniques disclosed above with regard to FIGS. 6-8 or any additional techniques may be used to identify a reference model 70 substantially similar to the deficient model 71.

After identifying reference models 70 that share features or geometrical characteristics with the deficient model 71, the CAD system 32 may determine (process block 226) PMI objects 80 from the reference models 70 (or databases) to assign (process block 228) the deficient model 71. In some embodiments, the determined (process block 226) PMI objects 80 to assign (process block 228) the deficient model 71 may include PMI objects 80 from one or more reference models 70 that share similar features as the deficient model. For example, a first subset of the features of the deficient model 71 may correspond to a first subset of features of a first reference model 70 and a second subset of the features of the deficient model 71 may correspond to a second subset of features of a second reference model 70. In this example, PMI objects 80 assigned (process block 228) to the deficient model 71 may be based on the first and second reference models 70. In additional embodiments, the PMI objects 80 assigned to the deficient model 71 may be based on any number of reference models 70. In this manner, the CAD system 32 may leverage reference models 70 with PMI objects 80 to automatically label similar features in deficient models with associated PMI objects 80 included in the reference models. It should be understood that in some embodiments the PMI objects assigned to the deficient model 71 may be based on the database (e.g., predefined library) of PMI objects 80 corresponding to certain features. In one embodiment, the tolerancing information associated with the PMI object 80 may be automatically calculated and assigned by relating the tolerance to the size of the model 72.

In one example, the deficient model 71 may include PMI objects 80 that include incorrect measurements or inaccurate acceptable thresholds for these measurements. The CAD system 32 may identify this as a deficient model 71. While in one embodiment, the thresholds and measurements of an reference model 70, as found in (e.g., a table of) a database, may be applied to the deficient model, in additional embodiments, the thresholds may be adjusted based on applying a suitable scale factor to the measurements applied from the database to automatically correct the threshold after the CAD system assigns the correct PMI objects. Therefore, the complete model 71' may include PMI objects applied from reference models 70 and another subset of PMI objects applied via other suitable techniques (e.g., scaling factors, interpolation, linear regression, singular value decomposition, etc.).

Figure 10:
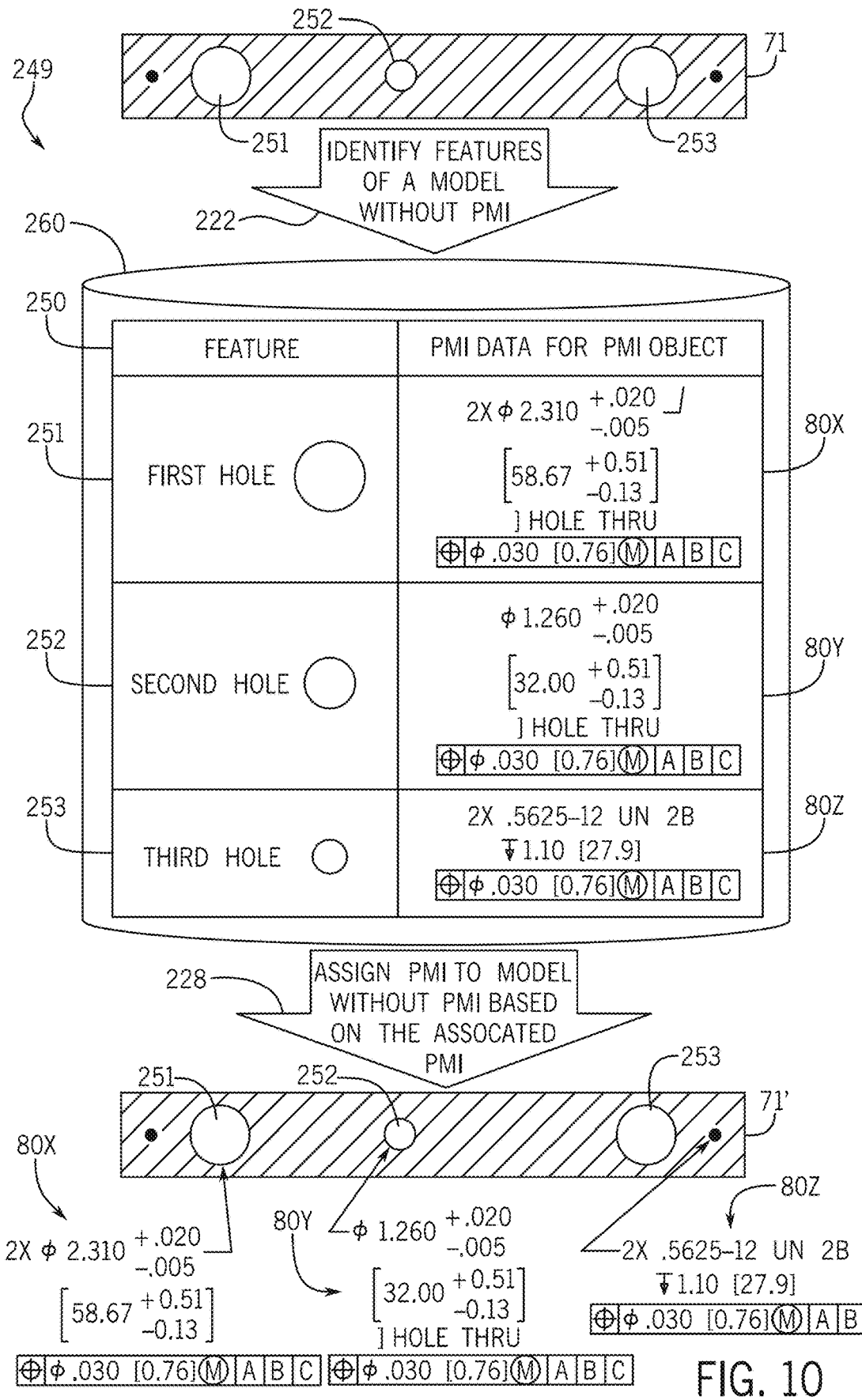
FIG. 10 is an example progression of yet another deficient model that is initially missing PMI objects, but is later assigned PMI objects, in accordance with an aspect of the present disclosure.

To help illustrate, FIG. 10 is a flow diagram 249 of a deficient model 71 assigned PMI objects 80, in accordance with an aspect of the present disclosure. As will be explained in more detail, in the illustrated embodiment, the deficient model 71 is deficient with regard to PMI objects 80. The deficient model 71 may be a model 72 (of a part or assembly) with missing assigned PMI objects 80, with inaccurate or deficient PMI objects 80, or missing certain PMI objects 80. After employing the flow diagram 220 of FIG. 9, the deficient model 71 is assigned PMI objects 80 from a reference model 70 and may become a complete model 71'.

In the illustrated embodiment, the deficient model 71 is a part having three different though holes; namely, a first through hole 251, a second through hole 252, and a third through hole 253. Prior to being assigned (process block 228) PMI objects 80, in this example, the deficient model 71 does not include PMI object 80. By employing the embodiments disclosed herein, the CAD system 32 may determine that the deficient model 71 is deficient with regard to PMI objects 80 (e.g., because the deficient model 71 does not include PMI objects 80, includes inaccurate PMI objects 80, or is missing PMI objects 80) and identify (process block 222) features 250 of the deficient model that require PMI objects 80.

In response, the CAD system 32 may leverage various feature recognition algorithms, as discussed above, to analyze the deficient model 71 and identify (process block 224) PMI objects corresponding to similar features 250. In one embodiment, the CAD system 32 may query a database 260 accessible to the CAD system 32 to identify PMI objects 80 corresponding to reference models 70 (e.g., stored in the database 260) that includes similar features 250 as the deficient model (e.g., the model with missing PMI objects). The CAD system 32 may query the database 260 to determine (process block 226) the PMI data 76 of PMI objects 80 respectively associated with the features 250 missing PMI objects 80. In this example, the CAD system 32 determines that the first through hole 251 is associated with a first PMI object 80X (e.g., based upon PMI data 76), the second through hole 252 is associated with a second PMI object 80Y (e.g., based upon PMI data 76 from the reference model 70), and the third through hole 253 is associated with a third PMI object 80Z (e.g., based upon PMI data 76). The CAD system 32 may then assign (process block 228) PMI objects 80 (in this example, the first PMI object 80X, the second PMI object 80Y, and the third PMI object 80Z), whereby the initial deficiencies associated with PMI objects 80 on the model are remedied.

As mentioned above, in one example, the deficient model 71 may include PMI objects 80 that include incorrect PMI data 76, such as incorrect measurements or inaccurate acceptable tolerances. The CAD system 32 may identify this as a deficient model 71. While in one embodiment, the thresholds and measurements of an reference model, as found in (e.g., a table of) the database 260, may be applied to the deficient model, in additional embodiments, the thresholds may be adjusted based on applying a suitable scale factor to the measurements applied from the database to automatically correct the threshold after the CAD system assigns the correct PMI objects. Therefore, the complete model 71' may include PMI objects 80 applied from a preexisting database 260 and another subset of PMI objects applied via other suitable techniques (e.g., scaling factors, interpolation, linear regression, singular value decomposition, etc.).

Technical effects of the present disclosure include systems and methods for automatically assigning PMI objects comprising PMI data and PMI associations to deficient models (e.g., a model deficient with regard to PMI objects), such that the PMI data and PMI association may be transferred from a reference model using detected similarities or may be transferred from one or more databases. Resources and time are saved in that the PMI objects assigned to the deficient model include PMI objects stored in one or more databases. After the deficient model is identified as a deficient model, a CAD system may query a database to identify PMI objects corresponding to a reference model (e.g., stored in the database) that includes similar features as the deficient model. The CAD system may then assign PMI objects associated with the features of the reference model (determined to substantially match) to the corresponding features of the deficient model. In this manner, the CAD system may leverage reference models with PMI objects to automatically label similar features in deficient models with those PMI objects. In addition, the CAD system may leverage a database of existing rules for assigning PMI objects to automatically assign PMI objects to deficient models.

This written description uses examples to disclose the claimed subject matter, including the best mode, and also to enable any person skilled in the art to practice the claimed disclosure, including making and using any devices or systems and performing any incorporated methods. The patentable scope of the claimed disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system comprising:
   a processor for implementing a computer-aided technology (CAx) system, the CAx system comprising a graphical-user-interface (GUI) configured to render computer-aided design (CAD) models comprising a part, an assembly, or both; and
   memory storing instructions configured to cause the processor to:
      identify a deficient CAD model, wherein the deficient CAD model is missing one or more expected Product and Manufacturing Information (PMI) objects, based upon one or more features not being associated with the missing one or more expected PMI objects;
      query a database of one or more existing CAD models to identify one or more existing PMI objects of a reference CAD model of the one or more existing CAD models, wherein the reference CAD model of the one or more existing CAD models is selected as the reference CAD model based on a determination that a threshold percentage of a number of corresponding geometric characteristics of the reference CAD model is within a threshold percent error of geometric characteristics corresponding to the one or more features of the deficient CAD model, wherein the one or more existing PMI objects comprise:
         a PMI reference indicating a particular type of PMI data to use for the missing one or more expected PMI objects; and
         a PMI annotation associating the particular type of PMI data to a particular feature of the one or more features not being associated with the missing one or more expected PMI objects of the deficient CAD model;
      attribute a subset of the one or more existing PMI objects to one or more features of the deficient CAD model, by identifying features that the subset of the one or more existing PMI objects are associated to and identifying corresponding features in the one or more features of the deficient CAD model; and
      assign the subset of the one or more existing PMI objects to the corresponding features in the one or more features of the deficient CAD model.

2. The system of claim 1, wherein the deficient CAD model includes one or more inaccurate PMI objects that are replaced in response to the instructions configured to cause the processor to assign the subset of the one or more existing PMI objects.

3. The system of claim 1, wherein the corresponding geometric characteristics and the geometric characteristics corresponding to the one or more features of the deficient CAD model comprise a surface-area-to-volume ratio, a number of faces, a plurality of weighted point sets, a shape and quantity of a plurality of external faces, a length of edges, a thread count, a number of physical openings, a volume, a total surface area, a crinkliness, a volumetric error, a deformation, or any combination thereof, respectively.

4. The system of claim 1, wherein the instructions are configured to cause the processor to query the database of the one or more existing CAD models to identify the one or more existing PMI objects based on one or more rules.

5. The system of claim 4, wherein the one or more rules comprise employing a global feature-based approach, a manufacturing-based approach, a graph-based approach, a histogram-based approach, a product information-based approach, or any combination thereof.

6. The system of claim 1, wherein the instructions are configured to cause the processor to assign tolerancing information associated with the attributed subset of the one or more existing PMI objects based on dimensions of the deficient CAD model or the reference CAD model.

7. The system of claim 6, wherein the instructions configured to cause the processor to assign the tolerancing information comprise applying a scaling factor to the assigned subset of the one or more existing PMI objects based on the dimensions of the deficient CAD model.

8. The system of claim 1, wherein the one or more existing PMI objects each comprise one or more visual representations of respective geometric, dimensioning, and tolerancing (GD&T) information of the reference CAD model.

9. The system of claim 1, wherein the one or more existing PMI objects each comprise one or more characters associated with a corresponding feature of the one or more features of the deficient CAD model or the one or more existing CAD models, wherein the each of the one or more characters collectively generate text indicative of a description of the corresponding feature.

10. A computer-implemented method for a CAx system, wherein the computer-implemeted method comprises:
identifying, via a processor-based device of a CAD system, a deficient CAD model, wherein the deficient CAD model is missing one or more expected Product and Manufacturing Information (PMI) objects, based upon one or more features not being associated with the missing one or more expected PMI objects;
querying, via the processor-based device, a database of one or more existing CAD models to identify one or more existing PMI objects of a reference CAD model of the one or more existing CAD models, wherein the reference CAD model of the one or more existing CAD models is selected as the reference CAD model based on a determination that a threshold percentage of a number of corresponding geometric characteristics of the reference CAD model is within a threshold percent error of geometric characteristics corresponding to the one or more features of the deficient CAD model, wherein the one or more existing PMI objects comprise:
a PMI reference indicating a particular type of PMI data to use for the missing one or more expected PMI objects; and
a PMI annotation associating the particular type of PMI data to a particular feature of the one or more features not being associated with the missing one or more expected PMI objects of the deficient CAD model;
attributing, via the processor-based device, a subset of the one or more existing PMI objects to one or more features of the deficient CAD model, by identifying features that the subset of the one or more existing PMI objects are associated to and identifying corresponding features in the one or more features of the deficient CAD model; and
assigning, via the processor-based device, the subset of the one or more existing PMI objects to the corresponding features in the one or more features of the deficient CAD model.

11. The computer-implemented method of claim 10, wherein querying the database of the one or more existing CAD models to identify the one or more existing PMI objects is based on one or more rules.

12. The computer-implemented method of claim 11, wherein the one or more rules comprise employing a global feature-based approach, a manufacturing-based approach, a graph-based approach, a histogram-based approach, a product information-based approach, or any combination thereof.

13. The computer-implemented method of claim 10, comprising assigning tolerancing information associated with the attributed subset of the one or more existing PMI objects based on dimensions of the deficient CAD model.

14. The computer-implemented method of claim 13, wherein assigning the tolerancing information comprises applying a scaling factor to the assigned subset of the one or more existing PMI objects based on the dimensions of the deficient CAD model.

15. A non-transitory computer readable medium, comprising computer- readable instructions that, when executed by one or more processors of a computer of a CAx system, cause the one or more processors to:
identify a deficient CAD model, wherein the deficient CAD model is missing one or more expected Product and Manufacturing Information (PMI) objects, based upon one or more features not being associated with the missing one or more expected PMI objects;
query a database of one or more existing CAD models to identify one or more existing PMI objects of a reference CAD model of the one or more existing CAD models, wherein the reference CAD model of the one or more existing CAD models is selected as the reference CAD model based on a determination that a threshold percentage of a number of corresponding geometric characteristics of the reference CAD model is within a threshold percent error of geometric characteristics corresponding to the one or more features of the deficient CAD model, wherein the one or more existing PMI objects comprise:
a PMI reference indicating a particular type of PMI data to use for the missing one or more expected PMI objects; and
a PMI annotation associating the particular type of PMI data to a particular feature of the one or more features not being associated with the missing one or more expected PMI objects of the deficient CAD model;
attribute a subset of the one or more existing PMI objects to one or more features of the deficient CAD model, by identifying features that the subset of the one or more existing PMI objects are associated to and identifying corresponding features in the one or more features of the deficient CAD model; and
assign the subset of the one or more existing PMI objects to the corresponding features in the one or more features of the deficient CAD model.

16. The non-transitory computer readable medium of claim 15, wherein the computer-readable instructions configured to cause the one or more processors to query the database of the one or more existing CAD models to identify the one or more existing PMI objects are based on a one or more rules.

17. The non-transitory computer readable medium of claim 16, wherein the one or more rules comprise employing a global feature-based approach, a manufacturing-based approach, a graph-based approach, a histogram-based approach, a product information-based approach, or any combination thereof.

18. The non-transitory computer readable medium of claim 15, wherein the computer-readable instructions are configured to cause the one or more processors to assign tolerancing information associated with the attributed subset of the one or more existing PMI objects based on dimensions of the deficient CAD model.

19. The non-transitory computer readable medium of claim 18, wherein the computer-readable instructions configured to cause the one or more processors to assign the tolerancing information comprise applying a scaling factor to the assigned subset of the one or more existing PMI objects based on the dimensions of the deficient CAD model.

20. The non-transitory computer readable medium of claim 15, wherein the one or more existing PMI objects each comprise one or more visual representations of respective geometric, dimensioning, and tolerancing (GD&T) information of the reference CAD model.

\* \* \* \* \*